(12) United States Patent
Mabille et al.

(10) Patent No.: US 11,915,564 B2
(45) Date of Patent: Feb. 27, 2024

(54) COVER FOR AN ELECTRONIC PAYMENT TERMINAL, CORRESPONDING ELECTRONIC PAYMENT TERMINAL

(71) Applicant: INGENICO GROUP, Paris (FR)

(72) Inventors: Gaetan Mabille, Crozes Hermitage (FR); Didier Coquelet, Puiseux-le-Hauberger (FR); Ludovic Neveu, Le Château-d'Olonne (FR); Johann Balasse, Courbevoie (FR)

(73) Assignee: INGENICO GROUP, Paris (FR)

( * ) Notice: Subject to any disclaimer, the term of this patent is extended or adjusted under 35 U.S.C. 154(b) by 182 days.

(21) Appl. No.: 16/499,084

(22) PCT Filed: Mar. 29, 2018

(86) PCT No.: PCT/EP2018/058047
§ 371 (c)(1),
(2) Date: Sep. 27, 2019

(87) PCT Pub. No.: WO2018/178222
PCT Pub. Date: Oct. 4, 2018

(65) Prior Publication Data
US 2020/0043299 A1 Feb. 6, 2020

(30) Foreign Application Priority Data
Mar. 31, 2017 (FR) ...................................... 1752771

(51) Int. Cl.
G07G 1/12 (2006.01)
G06Q 20/20 (2012.01)
G07F 7/08 (2006.01)

(52) U.S. Cl.
CPC ............... *G07G 1/12* (2013.01); *G06Q 20/20* (2013.01); *G07F 7/0886* (2013.01)

(58) Field of Classification Search
CPC .............. B32B 17/06; B32B 17/10816; B32B 17/10889; B32B 2307/412; G07G 1/12;
(Continued)

(56) References Cited

U.S. PATENT DOCUMENTS 7,635,819 B2 * 12/2009 Lee ........................ H01H 13/83
200/313
8,263,887 B2 * 9/2012 Chen .................... H01H 13/705
200/310

(Continued)

FOREIGN PATENT DOCUMENTS

| EP | 3018887 A1 | 5/2016 |
|---|---|---|
| FR | 2913843 A1 | 9/2008 |
| FR | 3018239 A1 | 9/2015 |

OTHER PUBLICATIONS

English translation of the Written Opinion of the International Searching Authority, for International Application No. PCT/EP2018/058047, filed Mar. 29, 2018.

(Continued)

*Primary Examiner* — Florian M Zeender
*Assistant Examiner* — Milena Racic
(74) *Attorney, Agent, or Firm* — David D. Brush; Westman, Champlin & Koehler, P.A.

(57) ABSTRACT

A cover for an electronic payment terminal having at least one zone to be back-lit. The cover includes at least one part having at least one lower layer and one upper layer assembled during the manufacture of the cover, the lower layer being opaque or semi-opaque and having at least one aperture facing the at least one zone to be back-lit when the cover is mounted on the electronic payment terminal. The upper layer is translucent and covers the at least one aperture in the lower layer.

10 Claims, 4 Drawing Sheets

(58) Field of Classification Search
CPC ........ H01H 13/86; B29C 45/14; B29C 45/16; B29K 55/02; B29K 75/00; G06F 1/16; G07F 7/0886
See application file for complete search history.

(56) References Cited

U.S. PATENT DOCUMENTS

| | | | | |
|---|---|---|---|---|
| 8,461,467 | B2* | 6/2013 | Hwa | G06F 3/0202 |
| | | | | 200/314 |
| 8,658,925 | B2* | 2/2014 | Chen | H01H 11/00 |
| | | | | 200/314 |
| 8,803,015 | B2* | 8/2014 | Toh | H01H 13/83 |
| | | | | 200/310 |
| 8,820,949 | B2* | 9/2014 | Takeda | H01H 13/83 |
| | | | | 362/23.17 |
| 9,029,723 | B2* | 5/2015 | Pegg | H01H 13/83 |
| | | | | 200/520 |
| 9,263,209 | B2* | 2/2016 | Chen | H01H 13/83 |
| 9,443,673 | B2* | 9/2016 | Chu | H01H 13/83 |
| 9,868,274 | B2* | 1/2018 | Kim | B32B 37/10 |
| 11,275,204 | B2* | 3/2022 | Nichol | G02B 6/006 |
| 2008/0156865 | A1* | 7/2008 | Leifer | G06Q 20/20 |
| | | | | 235/379 |
| 2008/0227507 | A1 | 9/2008 | Joo | |
| 2011/0038115 | A1* | 2/2011 | Halkosaari | H01H 13/83 |
| | | | | 361/679.08 |
| 2013/0076649 | A1* | 3/2013 | Myers | G06F 3/0412 |
| | | | | 345/173 |
| 2013/0121017 | A1* | 5/2013 | Tsai | H01H 3/125 |
| | | | | 362/602 |
| 2014/0151205 | A1* | 6/2014 | Chou | H01H 13/83 |
| | | | | 200/314 |
| 2015/0327694 | A1* | 11/2015 | Andre | H04M 1/0216 |
| | | | | 312/326 |
| 2016/0113135 | A1* | 4/2016 | Kim | H04M 1/185 |
| | | | | 361/679.01 |
| 2018/0278730 | A1* | 9/2018 | Saeed | G06Q 20/3278 |

OTHER PUBLICATIONS

International Search Report dated Oct. 24, 2017 for corresponding International Application No. PCT/EP2018/058047, filed Mar. 29, 2018.
Written Opinion of the International Searching Authority, for International Application No. PCT/EP2018/058047, filed Mar. 29, 2018.
Machine English translation of the European Office Action dated Apr. 22, 2021 for corresponding EP Application No. 18713683.3.

* cited by examiner

COVER FOR AN ELECTRONIC PAYMENT TERMINAL, CORRESPONDING ELECTRONIC PAYMENT TERMINAL

CROSS-REFERENCE TO RELATED APPLICATIONS

This Application is a Section 371 National Stage Application of International Application No. PCT/EP2018/058047, filed Mar. 29, 2018, the content of which is incorporated herein by reference in its entirety, and published as WO 2018/178222 on Oct. 4, 2018, not in English.

TECHNICAL FIELD

The field of the invention is that of ergonomics and more particularly that of the back-lighting of electronic payment terminals as well as that of the physical securing of such terminals, especially with regard to their cover.

TECHNOLOGICAL BACKGROUND

The back-lighting function of a payment terminal enables certain zones of the terminal, such as for example the keypad keys, the bankcard insertion slot or again the zone dedicated to a contactless payment, to be illuminated from within the terminal so that it can be seen by the user.

Back-lighting also makes it possible to implement visual indicators informing the user of the activation of a function, such as for example (fixed or flashing) luminous or light spots when the contactless payment function is activated.

These back-lit zones are therefore zones that should not be covered with the cover of the terminal which, at the same time, needs to be opaque in order to mask and protect the interior of the terminal, for obvious security reasons.

Besides, the back-lighting of a payment terminal must be designed and implemented so as to ensure the securing and the physical integrity of the terminal against external physical attacks.

Indeed, there are for example attacks known as "overlay attacks" in which a part of the electronic payment terminal is overlaid with a plastron or plate that is wider than the authentic cover of the terminal in order to conceal fraudulent elements that make it possible to access sensitive data that transit through the terminal or in order to prevent the release of the inserted smart card (for subsequent retrieval), etc.

These attacks are especially possible when there is a flaw, however small, in the physical means for securing the terminal, a flaw such as for example fragile areas between two elements or two zones of the cover: back-lit zones are potentially such areas.

Thus, for example, certain electronic payment terminals have light guides to guide the light given by a light source inside the terminal (for example one or more LEDs) towards the zone to be back-lit. These light guides pass through apertures of the cover (for the contactless card reader for example) and therefore constitute points of fragility and access to the interior of the electronic payment terminal and are therefore potentially points of attack.

One prior-art solution to limit these fragile features is to reduce the dimensions of the light guides, or to limit the back-lit zones. However, one drawback of these solutions is that they degrade the ergonomy of the electronic payment terminal.

There is therefore a need for a back-lighting technique for the back-lighting of an electronic payment terminal that is optimal in terms of ergonomy for the user, while in no way degrading the physical security of the terminal.

There is also a need for such a back-lighting technique that is cost effective and has ease of technical implementation.

SUMMARY

The invention proposes a cover for an electronic payment terminal having at least one zone to be back-lit, the cover comprising at least one part comprising at least one lower layer and one upper layer assembled during the manufacture of said cover. In addition, the lower layer is opaque or semi-opaque and has at least one aperture facing the at least one zone to be back-lit when the cover is mounted on the electronic payment terminal and the upper layer is translucent and covers the at least one aperture in the lower layer.

Thus, the invention proposes a novel and inventive solution for back-lighting an electronic payment terminal while at the same time ensuring the physical integrity of the terminal.

To this end, the invention, according to its different embodiments, provides for the cover of the electronic payment terminal to be at least partly constituted by two superimposed layers during the manufacture of the cover, the lower layer being opaque (or semi-opaque) and having one or more apertures facing the zone or zones to be back-lit and the upper layer being translucent and covering at least the aperture of the lower layer.

Thus, at the place or places where the cover could be fragile because of the aperture or apertures made to enable back-lighting, a transparent upper layer is added to it to allow the back-lighting light to pass through while at the same time providing a physical barrier on top of the aperture or apertures of the lower layer.

Since these two layers are assembled during the manufacture of the cover, this assembly has no fragility, including at the boundaries of the aperture or apertures of the lower layer, because these two layers cannot be separated without destroying the cover itself. Thus, no spy element or fraudulent element can be inserted at the position of the aperture of the lower layer, enabling optimal back-lighting. Indeed, the zone to be back-lit can be very wide because it is entirely covered with the transparent upper layer of the cover.

Besides, this solution makes it very difficult to carry out a "overlay" attack which would necessarily degrade the appearance as well as the feel and the hardness of these back-lit zones overlaid with a layer of transparent material. Such an attack would then be detectable by a user with the naked eye and the user would not use the electronic payment terminal and would warn its owner.

Finally, since the upper layer is translucent and not completely transparent, it enables back-lighting while at the same time preventing visibility when the electronic payment terminal is not back-lit. Indeed, a translucent material masks the elements that it covers or makes them blurred and without outlines if it is not lit but lets light pass through when it is lit as in the case of a back-lighting of an electronic payment terminal.

According to one particular aspect of the invention, the lower and upper layers are obtained by a technique for manufacturing the cover that belongs to the group comprising:

the overmolding of the upper layer on the lower layer;
the bi-injection of the upper and lower layers.

Thus, according to this particular embodiment of the invention, the cover manufacturing technique makes the two layers inseparable without however a mixing of the materials. The cover then has a surface cohesion, without aperture and therefore without any flaws that could jeopardize the physical integrity of the electronic payment terminal, contrary to certain prior-art solutions that provide for the gluing on, from the exterior, of a protective plastron or plate that does not offer such security. Indeed, with prior-art solutions, the plastron can be removed and replaced by a malicious plastron or plate as in an overlay attack for example.

In particular, the lower layer comprises polycarbonate or polycarbonate/acrylonitrile butadiene styrene.

Thus, according to this particular embodiment of the invention, the opaque lower layer is for example made out of PC/ABS (polycarbonate/acrylonitrile butadiene styrene), which is a mixture of PC and ABS. Indeed, this mixture gives a material that combines the high transformability of ABS with mechanical properties of impact resistance and heat resistance of PC so as to achieve maximum increase in the quality of the cover of the electronic payment terminal.

According to one particular characteristic, the upper layer comprises thermoplastic elastomer or thermoplastic polyurethane.

Thus, according to this particular embodiment of the invention, the translucent upper layer is for example made of thermoplastic polyurethane also called TPU, a material belonging to the group of thermoplastic elastomers (TPE or polyolefin-based thermoplastic elastomers). The performance characteristics of thermoplastic polyurethanes lies in the combination of their high physical and chemical properties.

The invention also relates to an electronic payment terminal comprising a cover as described here above.

LIST OF FIGURES

Other features and advantages of the invention shall appear from the following description, given by way of an indicative and non-exhaustive example, and from the appended drawings, of which:

FIGS. 1a to 1f present different views of a cover of an electronic payment terminal according to one embodiment of the invention;

DETAILED DESCRIPTION OF THE INVENTION

Figure 1A:
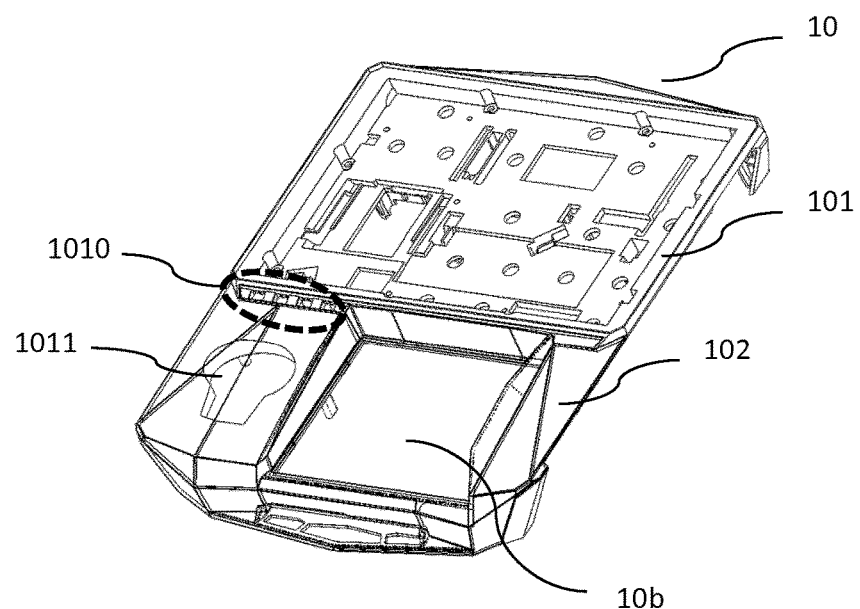

In all the figures of the present document, the identical elements and steps are designated by a same reference.

The general principle of the invention consists of the encasing (using a known, overmolding or bi-injection type method) of the covering of an electronic payment terminal by means of a translucent thermoplastic material or slightly transparent material, at certain places on the cover, such as for example zones designated for the back-lighting. Thus, in this or these back-lighting zones, the cover (which is classically opaque to make the interior of the electronic payment terminal invisible) has perforations/apertures to make the light from the back-lighting pass through and is overlaid with the second layer of translucent material which for its part also lets back-lighting light pass through.

The final result gives a uniform external appearance, without holes and therefore flawless for the physical integrity of the cover of the electronic payment terminal. Indeed, through the surface cohesion between materials, obtained at the very time of the manufacture of the cover of the electronic payment terminal, it is not possible to remove the translucent external layer. Thus, this solution enables openings/apertures to be made in the opaque part in specific zones. The translucent part covers these openings/apertures to avoid giving access to secure functions.

In addition, as already indicated here above, this solution offers a special appearance (in the zones that are to be back-lit) that is both opaque when the back lighting is not activated and transparent when it is activated. This particular appearance is also accompanied by a specific feel, because of the translucent upper layer, and especially because of a specific hardness of the cover of the electronic payment terminal. These different elements that differentiate this cover from a classic cover make it therefore very difficult to carry out an overlay attack that would necessarily degrade the visual aspect and/or the feel and/or the hardness of these back-lit zones. This solution therefore makes it possible to implement optimal back-lit zones in an electronic payment terminal while ensuring the physical integrity of this terminal.

FIGS. 1a to 1f show different views of a cover 10 of an electronic payment terminal according to one embodiment of the invention.

According to this embodiment, the cover 10 comprises a first lower layer 101 having at least two zones of apertures enabling back-lighting.

A first zone of aperture 1010 has for example four small apertures corresponding to an indicator for activating the contactless payment function. Thus, when the contactless payment is activated, four light spots appear (coming for example from green LEDs activated continuously or alternately one after the other).

A second aperture 1011, a wider aperture, corresponds for its part to the back-lighting of the contactless payment logo function which lights up (often through a white-colored LED) when the contactless payment is activated in order to guide the user in the positioning of his contactless payment card.

Figure 3:
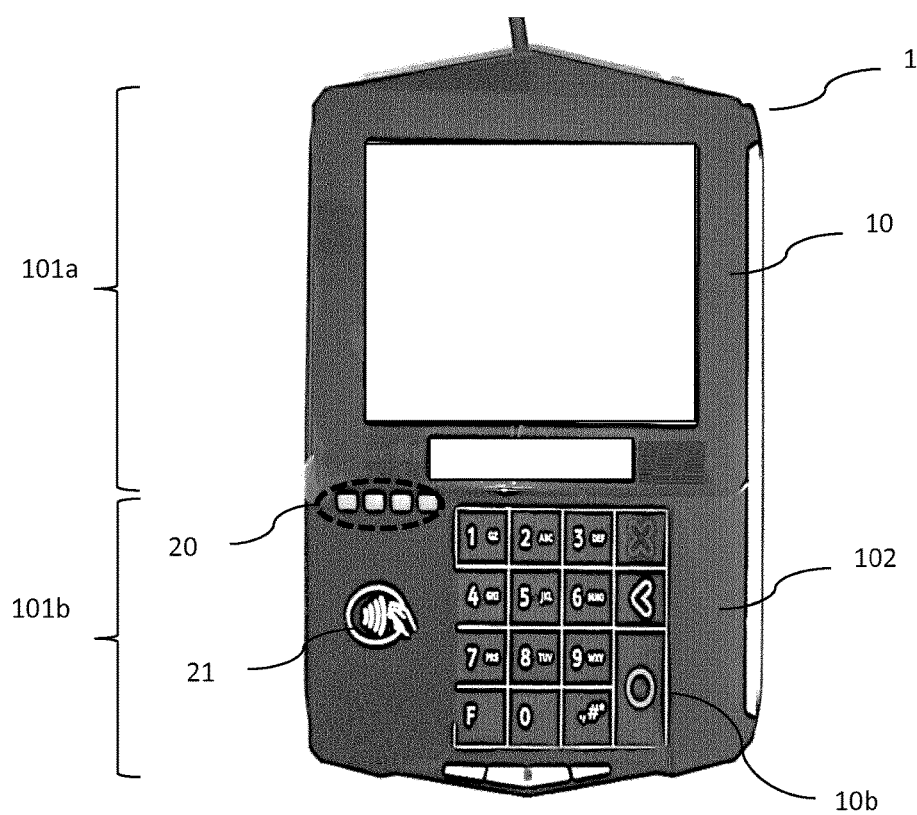
FIG. 3 shows a front view of an electronic payment terminal comprising a cover according to one embodiment of the invention.

These two zones of apertures 1010 and 1011 correspond for example respectively to two back-lighting zones 20 and 21 that can be seen in FIG. 3 (illustrating a front view of the electronic payment terminal).

Classically, the cover of an electronic payment terminal is formed by an opaque material in order to mask the interior of the electronic payment terminal. According to this embodiment, the lower layer 101 is therefore opaque and constituted for example by PC/ABS (polycarbonate/acrylonitrile butadiene styrene) which is a mixture of PC and ABS. Thus, this lower layer 101 has optimal qualities combining for example those of ABS (high transformability for example) and those of PC (excellent mechanical properties, impact resistance and heat resistance for example).

Besides, according to this embodiment, the cover 10 also comprises an upper layer 102 covering only one part of the lower layer 101 (this can be seen in FIG. 1d for example) and especially the part 101b of the lower layer 101 having aperture zones 1010 and 1011 intended for back-lighting. In addition, this upper layer 102 is constituted by a translucent material (such as for example thermoplastic polyurethane, denoted as TPU here below) used on the one hand to mask the elements that it covers when there is no back-lighting and, on the other hand, to allow the back-lighting light to pass through.

Figure 1B:
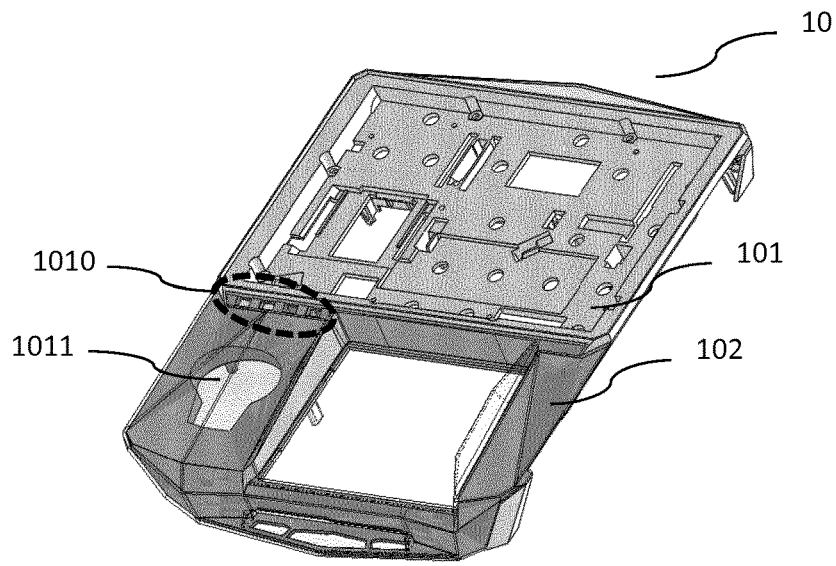

This is particularly illustrated in FIGS. 1a and 1b which present this upper layer 102 in transparency (as in a back-lit configuration) on top of the lower layer 101 so as to cover it without opaquely masking it.

Figure 1C:
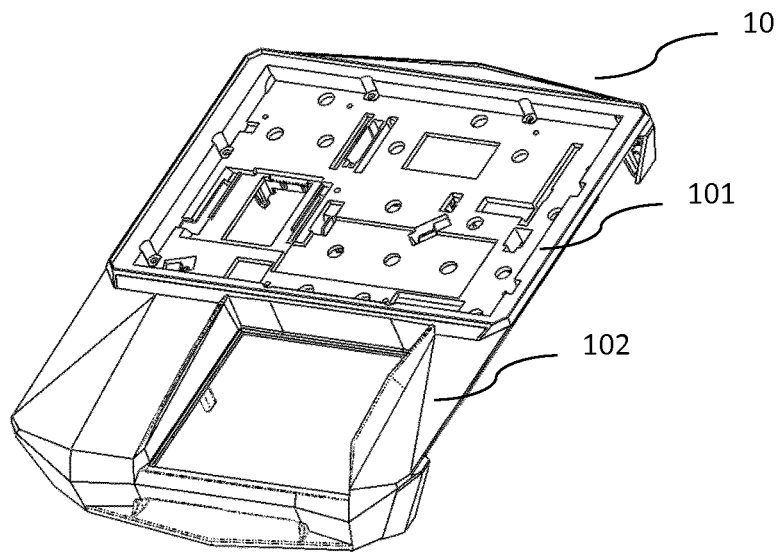
Figure 1D:
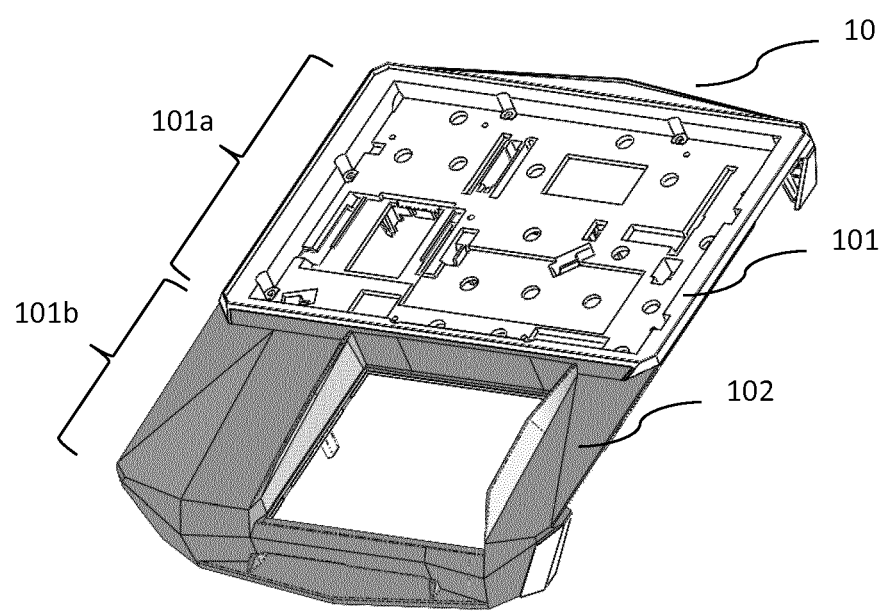

For example, as illustrated in FIG. 1d, the part 101a of the lower layer 101 that is not covered by the upper layer 102 corresponds to a zone for receiving the screen (as illustrated more visibly in FIG. 3), subsequently mounted on the electronic payment terminal cover and not needing to be covered by a layer of translucent material.

It will be noted in FIG. 1a that the two layers 101 and 102 of the cover of the electronic payment terminal also have an aperture 10b, making it possible for example to receive a keypad (as illustrated more visibly in FIG. 3) that requires access to the printed circuit board for the electronic connections.

FIGS. 1c and 1d for their part present the upper layer 102 masking a part of the lower layer 101, as in a configuration where there is no back-lighting for example. It can thus be seen that the elements of the lower layer 101 and especially the aperture zones 1010 and 1011 cannot be seen beneath the upper layer 102 when they are not back-lit. The translucent material chosen for the upper layer 102 therefore makes it possible to comply with the criterion of opaqueness of the cover of the electronic payment terminal in a non-back-lit configuration while at the same time enabling the back-lighting to be implemented securely.

Figure 1E:
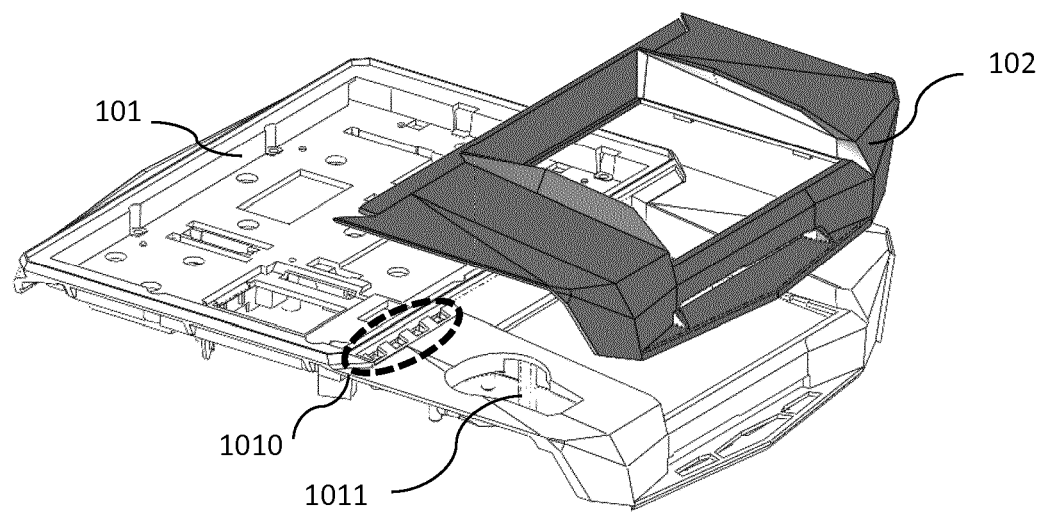
Figure 1F:
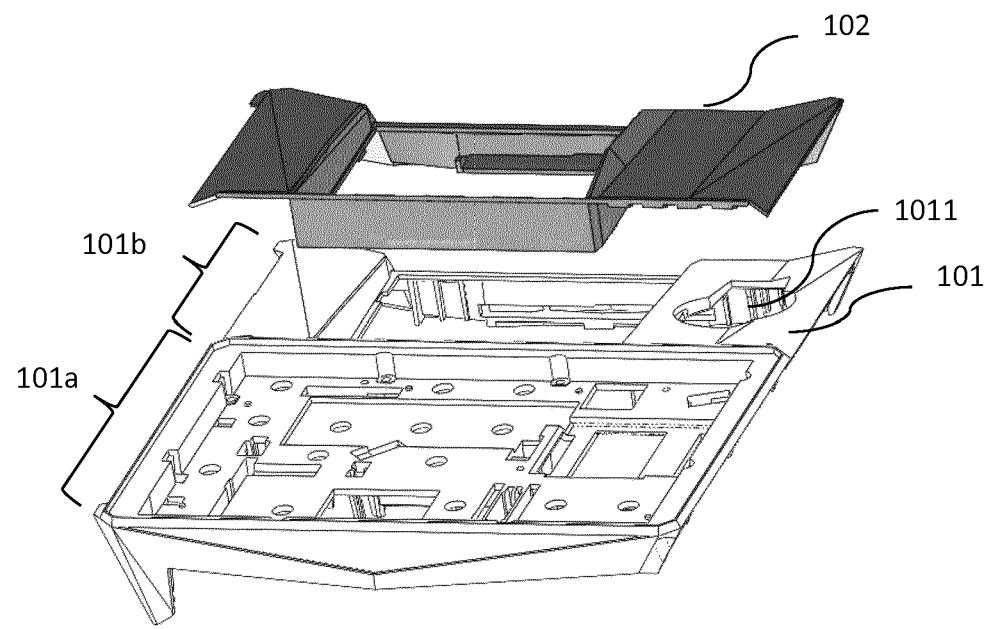

FIGS. 1e and 1f for their part show two exploded views in which the upper layer 102 is shown in grey, above the part 101b of the lower layer 101 on which it is mounted during the manufacturing of the cover 10 of the electronic payment terminal. These views also make it possible to clearly visualize the fact that the zones 1010 and 1011 planned for the back-lighting are covered with the upper layer 102.

Figure 2:
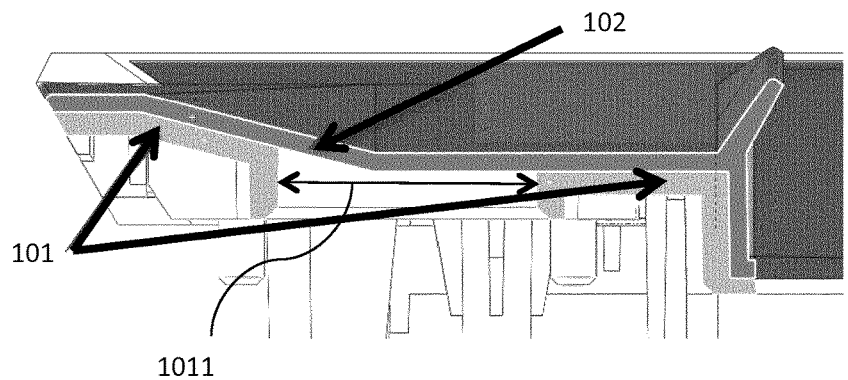
FIG. 2 illustrates a view in section of a part of a cover of an electronic payment terminal according to one embodiment of the invention.

FIG. 2 for its part illustrates a sectional view of a part of the cover 10 of the electronic payment terminal at the level of the aperture zone 1011 planned for the back-lighting of the contactless payment logo.

Thus it can be seen that this zone 1011 truly corresponds to an aperture in the lower layer 101 and that the upper layer 102 covers this aperture 1011 so as to protect access to the electronic payment terminal.

For example, according to a first variant of the manufacture of the cover of the electronic payment terminal, the translucent layer 102 (for example made of TPU) covers the opaque layer 101 through a bi-injection method. This creates cohesion and not a mixture between the materials so as to form only one part constituting the cover of the electronic payment terminal while enabling the optimal implementation of the back-lit zones. Indeed, since the aperture zones in the opaque layer of the cover are covered by the translucent layer in a homogenous and inviolable manner because of the manufacture itself, they can be large-sized if necessary and can have any shape.

According to a second variant of the manufacturing of the cover of the electronic payment terminal, the translucent layer 102 covers the opaque layer 101 by means of a overmolding method making it possible, in the present case, to obtain protection for the opaque lower layer by means of a translucent upper layer. The same advantages as those obtained by the method of bi-injection are obtained by this method of overmolding.

Hence, any other method of manufacture showing the same advantages can of course be used such as for example a method of bi-injection or overmolding in using translucent ABS, silicon rubber or LSR (liquid silicon rubber).

Finally, FIG. 3 presents a front view of an electronic payment terminal 1 according to this embodiment.

As already indicated here above, the cover 10 of the electronic payment terminal 1 has a first part 101a intended especially to receive the screen and the second part 101b intended for the keypad (zone 10b) as well as the contactless payment function illustrated more particularly by two back-lit zones 20 and 21. It is this part 101b that is covered by the translucent upper layer 102 so as to implement this back-lighting in an optimal and secure manner.

According to other embodiments, the lower layer of the electronic payment terminal cover can be entirely coated with a translucent upper layer in order to obtain the same effects as those described with reference to the embodiment described here above.

Finally, back-lit zones other than those described here above can be planned in the electronic payment terminal and coated with the translucent upper layer, according to the same principles as in the embodiment described here above.

The invention claimed is:

1. An electronic payment terminal comprising:
   a terminal housing;
   a backlighting in the terminal housing;
   at least one zone in the terminal housing configured to be illuminated when the backlighting of said zone is activated; and
   a housing cover comprising:
      at least one part comprising at least one lower layer and one upper layer assembled during manufacture of said housing cover,
      said lower layer being opaque or semi-opaque and having at least one aperture facing said at least one zone, and
      said upper layer covering said at least one aperture in said lower layer, said upper layer being made of a translucent material configured to mask internal elements in the terminal housing, covered by the upper layer when the backlighting is not activated, and to allow a light emitted by the backlighting to pass through when the backlighting is activated, and wherein:
      said upper layer is overmolded on said lower layer; or
      said upper layer and said lower layer are bi-injected layers cohered to one another.

2. The electronic payment terminal according to claim 1, wherein said lower layer comprises polycarbonate or polycarbonate/acrylonitrile butadiene styrene.

3. The electronic payment terminal according to claim 1, wherein said upper layer comprises thermoplastic elastomer or thermoplastic polyurethane.

4. The electronic payment terminal according to claim 1, wherein the upper layer overlays the lower layer so as to coat at least part of the lower layer.

5. The electronic payment terminal according to claim 4, wherein the at least part of the lower layer that is overlaid by the upper layer is substantially parallel and adjacent to the upper layer.

6. The electronic payment terminal according to claim 1, wherein the lower layer comprises a part not covered by the upper layer for receiving a screen.

7. The electronic payment terminal according to claim 1, wherein the lower layer and the upper layer comprise an aperture to receive a keypad.

8. A method of manufacturing a terminal housing for an electronic payment terminal, the method comprising:

assembling at least one part of the a housing cover comprising at least one lower layer and one upper layer by:

overmolding of said upper layer on said lower layer; or bi-injection of said upper and lower layers, said lower layer being opaque or semi-opaque and having at least one aperture facing a zone in the terminal housing when said housing cover is mounted on said electronic payment terminal, said zone being configured to be illuminated when a backlighting in the terminal housing is activated, and said upper layer covering said at least one aperture in said lower layer, said upper layer being made of a translucent material configured to mask internal elements in the terminal housing, covered by the upper layer when the backlighting is not activated, and to allow a light emitted by the backlighting to pass through when the backlighting is activated.

9. The method according to claim 8, wherein the assembling comprises overlaying the lower layer with the upper layer so as to coat at least part of the lower layer.

10. The method according to claim 9, wherein the at least part of the lower layer that is overlaid by the upper layer is substantially parallel and adjacent to the upper layer.

\* \* \* \* \*